(12) United States Patent
Ke

(10) Patent No.: US 12,003,084 B2
(45) Date of Patent: Jun. 4, 2024

(54) FOLDABLE EMERGENCY POWER BOX WITH SHAFT STRUCTURE ALLOWING WIRES TO PENETRATE THROUGH

(71) Applicant: SHENZHEN BILLDA TECHNOLOGY CO., LTD, Shenzhen (CN)

(72) Inventor: Jianjun Ke, Shenzhen (CN)

(73) Assignee: SHENZHEN BILLDA TECHNOLOGY CO., LTD, Shenzhen (CN)

( * ) Notice: Subject to any disclaimer, the term of this patent is extended or adjusted under 35 U.S.C. 154(b) by 235 days.

(21) Appl. No.: 17/849,697

(22) Filed: Jun. 26, 2022

(65) Prior Publication Data

US 2022/0329055 A1    Oct. 13, 2022

Related U.S. Application Data

(63) Continuation of application No. PCT/CN2021/097818, filed on Jun. 2, 2021.

(30) Foreign Application Priority Data

Apr. 13, 2021    (CN) .......................... 202120742012.7

(51) Int. Cl.
  *H02G 3/08*    (2006.01)
  *H02G 3/18*    (2006.01)

(52) U.S. Cl.
  CPC ............. *H02G 3/086* (2013.01); *H02G 3/083* (2013.01); *H02G 3/18* (2013.01)

(58) Field of Classification Search
  None
  See application file for complete search history.

(56) References Cited

U.S. PATENT DOCUMENTS

| | | | |
|---|---|---|---|
| 6,170,685 B1 * | 1/2001 | Currier | H02G 3/121 220/6 |
| 8,172,588 B2 * | 5/2012 | Johnson | H02G 3/00 439/215 |
| 11,047,557 B1 * | 6/2021 | McMillan | F21V 23/04 |
| 11,677,224 B1 * | 6/2023 | Pettengill, Jr. | H02G 3/10 174/18 |
| 2004/0048494 A1 * | 3/2004 | Yu | H01R 35/02 439/11 |
| 2005/0018435 A1 * | 1/2005 | Selkee | F21V 33/0076 362/240 |

(Continued)

FOREIGN PATENT DOCUMENTS

| | | |
|---|---|---|
| CN | 102954098 B | 6/2015 |
| CN | 104724010 A | 6/2015 |

(Continued)

*Primary Examiner* — Krystal Robinson

(57) ABSTRACT

Provided is a foldable emergency power box with a shaft structure allowing wires to penetrate through. A shaft assembly is arranged to connect two box bodies, so that the emergency power box may be of different structures to flexibly adapt to different installation scenarios; and a cavity is formed in the shaft assembly to allow connecting wires to penetrate through, so that a rotary structure is realized without exposing the internal connecting wires, and thus, the foldable emergency power box is safe and practical.

10 Claims, 2 Drawing Sheets

(56) References Cited

U.S. PATENT DOCUMENTS

| | | | | |
|---|---|---|---|---|
| 2009/0314541 A1* | 12/2009 | Jones | ................ | H02G 3/086 |
| | | | | 174/559 |
| 2013/0135809 A1 | 5/2013 | Uchiyama et al. | | |
| 2020/0099206 A1* | 3/2020 | Strong | ................ | H02G 3/383 |
| 2023/0139027 A1* | 5/2023 | Murphy | ................ | H02G 3/34 |
| | | | | 174/74 R |

FOREIGN PATENT DOCUMENTS

| | | | | |
|---|---|---|---|---|
| CN | 204387086 U | | 6/2015 | |
| CN | 104724010 B | * | 12/2016 | ........ B60R 16/033 |
| CN | 207652079 U | | 7/2018 | |
| CN | 111332919 A | | 6/2020 | |
| CN | 108644225 B | | 2/2021 | |

* cited by examiner

FOLDABLE EMERGENCY POWER BOX WITH SHAFT STRUCTURE ALLOWING WIRES TO PENETRATE THROUGH

BACKGROUND OF THE INVENTION

1. Technical Field

The invention relates to the field of emergency power supplies, in particular to a foldable emergency power box with a shaft structure allowing wires to penetrate through.

2. Description of Related Art

Emergency lights typically comprise emergency lights, emergency exit sign lights and indicator lights. Generally, in the event of an emergency such as a fire, normal lights will be turned off, and the emergency lights will start to work to guide trapped people to be evacuated or carry out fire-fighting and rescue activities.

Existing emergency lights comprise an emergency power supply, a power junction box and an emergency light body, wherein the emergency power supply is provided with multiple charging AC wires to be connected to an external mains supply, multiple signal wires to be connected to the emergency light body and multiple input/output wires connected to the emergency light body and supplying power to the emergency light body. In the prior art, the power box of emergency power supplies is of an integrated structure, and a power supply, wires and a circuit board are accommodated in one space; such a power box can be installed in only one manner and cannot adapt to different installation scenarios; and even if such a power box is shape-variable and foldable, wires between different power boxes have stretch across the power boxes outside the power boxes, which leads to security threats to some extents. So, a novel foldable power box structure is needed urgently.

BRIEF SUMMARY OF THE INVENTION

The objective of the invention is to overcome the defects of the prior art by providing a foldable emergency power box with a shaft structure allowing wires to penetrate through. According to the foldable emergency power box with a shaft structure allowing wires to penetrate through, two box bodies are connected through a shaft structure, so that the emergency power box may be of different structures and can adapt to different installation scenarios; and a cavity is formed in a shaft assembly to allow connecting wires to penetrate through, so that a rotary structure is realized without exposing the internal connecting wires, and thus, the foldable emergency power box is safe and practical.

To fulfill the above objective, the invention provides a foldable emergency power box with a shaft structure allowing wires to penetrate through, comprising a first box body for accommodating a main control circuit board and a second box body for accommodating a power supply, wherein the first box body and the second box body are rotatably connected through a shaft assembly, a cavity is formed in the shaft assembly, and wire holes communicated with the first box body and the second box body are formed in two sides of the cavity respectively; and an internal connecting wire connected to the power supply penetrates through the wire hole, stretches across the cavity in the shaft assembly and extends into the first box body to be electrically connected to the main control circuit board, and the main control circuit board is connected to an external emergency light through an external connecting wire.

Specifically, the shaft assembly is an 8-shaped shaft assembly having two ends provided with a first circular connecting portion and a second circular connecting portion respectively, the first circular connecting portion is rotatably connected to the first box body, the second circular connecting portion is rotatably connected to the second box body, and the wire holes are formed in a side, close to the first box body, of the first circular connecting portion and a side, close to the second box body, of the second circular connecting portion respectively.

Preferably, arc-shaped anti-skid grooves are formed along an edge of the first circular connecting portion and an edge of the second circular connecting portion respectively, multiple sliding teeth are disposed in each arc-shaped anti-skid groove in parallel, and anti-skid blocks are disposed at positions, opposite to the arc-shaped anti-skid grooves, of the first box body and the second box body and extend into gaps between the sliding teeth.

Preferably, arc-shaped stop grooves are formed along an edge of the first circular connecting portion and an edge of the second circular connecting portion respectively, and stop pillars are disposed at positions, opposite to the arc-shaped stop grooves, of the first box body and the second box body and extend into the arc-shaped stop grooves.

Preferably, the arc-shaped anti-skid grooves and the arc-shaped stop grooves have a radian of 90°.

Specifically, a power supply chamber is disposed in the second box body, and the power supply is installed in the power supply chamber; and a power installation hole is formed in an outer wall, opposite to the power supply chamber, of the second box body, and a power supply lid is disposed over the power installation hole.

Specifically, a power wire outlet is formed in an end, away from the shaft assembly, of the first box body, and the external connecting wire has an end electrically connected to the main control circuit board and an end stretching out via the power wire outlet.

Specifically, first installation portions extend from a side wall of the first box body and a side wall of the second box body, and first bolt holes allowing bolts to be inserted and installed therein are formed in the first installation portions.

Preferably, anti-skid portions are disposed on sides, away from the first installation portions, of the first box body and the second box body, and the anti-skid portions are located on edges of the first box body and the second box body and extend upwards to form anti-skid lines.

Preferably, a second installation portion is disposed on a recess, between the first circular connecting portion and the second circular connecting portion, of the shaft assembly, and a second bolt hole allowing a bolt to be inserted and installed therein is formed in the second installation portion.

Compared with the prior art, the invention has the following beneficial effects: the foldable emergency power box with a shaft structure allowing wires to penetrate through comprises a first box body for accommodating a main control circuit board and a second box body for accommodating a power supply, the first box body and the second box body are rotatably connected through a shaft assembly, a cavity is formed in the shaft assembly, and wire holes communicated with the first box body and the second box body are formed in two sides of the cavity respectively; and an internal connecting wire connected to the power supply penetrates through the wire holes, stretches across the cavity in the shaft assembly and extends into the first box body to be electrically connected to the main control circuit board, and the main control circuit board is connected to an external emergency light through an external connecting wire. The shaft assembly is arranged to connect two box bodies, so that the emergency power box may be of different structures to flexibly adapt to different installation scenarios; and the cavity is formed in the shaft assembly to allow connecting wires to penetrate through, so that a rotary structure is realized without exposing the internal connecting wires, and thus, the foldable emergency power box is safe and practical.

Main reference signs: 1, first box body; 11, main control circuit board; 12, power wire outlet; 2, second box body; 21, power supply lid; 22, power supply; 23, power supply chamber; 3, anti-skid portion; 4, shaft assembly; 41, stop groove; 42, anti-skid groove; 43, sliding tooth; 44, wire hole; 5, external connecting wire; 6, first installation portion; 61, first bolt hole; 7, second installation portion; 71, second bolt hole.

DETAILED DESCRIPTION OF THE INVENTION

To more clearly explain the invention, the invention will be further described below in conjunction with the accompanying drawings.

In the prior art, the power box of emergency power supplies is of an integrated structure, and a power supply, wires and a circuit board are accommodated in one space; such a power box can be installed in only one manner and cannot adapt to different installation scenarios; and even if such a power box is shape-variable and foldable, wires between different power boxes have to be configured outside the boxes, which leads to security threats to some extents. So, a novel foldable power box structure is needed urgently.

Figure 1:
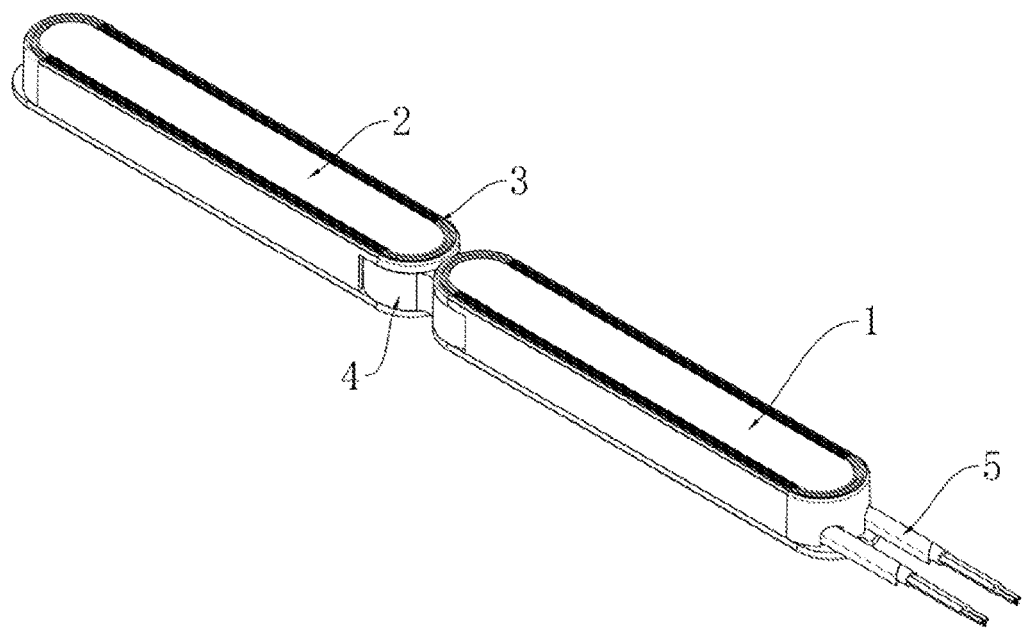
FIG. 1 is a three-dimensional view of the invention.
Figure 2:
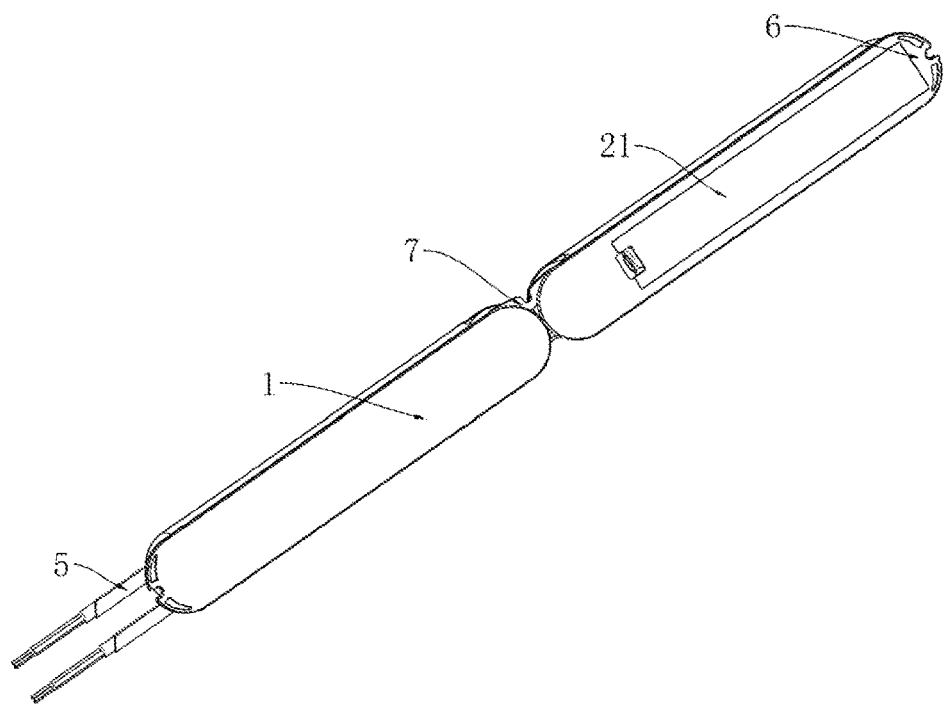
FIG. 2 is a back view of the invention.

To overcome the defects and drawbacks of the prior art, the invention provides a foldable emergency power box with a shaft structure allowing wires to penetrate through. Referring to FIG. 1-FIG. 2, the foldable emergency power box comprises: a first box body 1 for accommodating a main control circuit board 11 and a second box body 2 for accommodating a power supply 22, wherein the first box body 1 and the second box body 2 are rotatably connected through a shaft assembly 4, a cavity is formed in the shaft assembly 4, and wire holes 44 communicated with the first box body 1 and the second box body 2 are formed in two sides of the cavity respectively; and an internal connecting wire connected to the power supply 22 penetrates through the wire holes 44, stretches across the cavity in the shaft assembly 4 and extends into the first box body 1 to be electrically connected to the main control circuit board 11, and the main control circuit board 11 is connected to an external emergency light through an external connecting wire 5. The first box body 1 and the second box body 2 are rotatably connected through the shaft assembly 4, so that the first box body 1 and the second box body 2 can be rotated and folded along the shaft assembly 4 to flexibly adapt to different installation scenarios; and the cavity is formed in the shaft assembly 4, so that the internal connecting wire can stretch across the two box bodies and the shaft assembly 4 without being exposed, and the rotation of the shaft assembly will not be affected.

Figure 3:
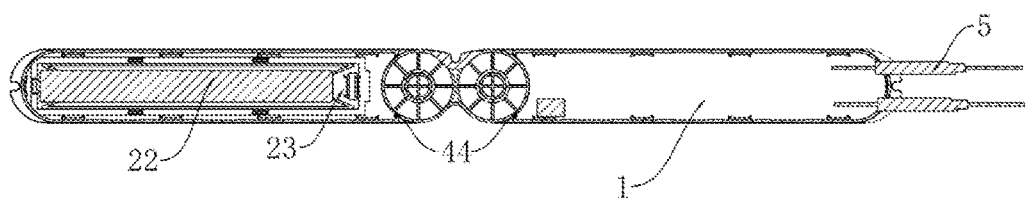
FIG. 3 is a sectional view of the invention.
Figure 4:
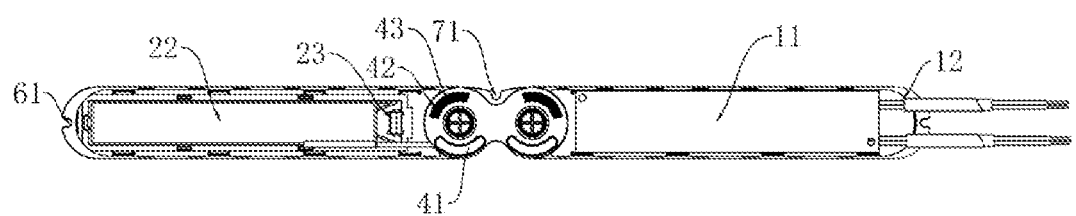
FIG. 4 is a schematic diagram of a shaft assembly of the invention.

In this embodiment, referring to FIG. 1-FIG. 3, the shaft assembly 4 is an 8-shaped shaft assembly 4 having two ends provided with a first circular connecting portion and a second circular connecting portion respectively, the first circular connecting portion is rotatably connected to the first box body 1, the second circular connecting portion is rotatably connected to the second box body 2, and the wire holes 44 are formed in a side, close to the first box body 1, of the first circular connecting portion and a side, close to the second box body 2, of the second circular connecting portion respectively. Through the 8-shaped shaft assembly 4, the first box body 1 and the second box body 2 can rotate to be in parallel, and the first box body 1 and the second box body 2 rotate on the first circular connecting portion and the second circular connecting portion separately without being interfered by each other.

In a preferred embodiment, referring to FIG. 1-FIG. 4, arc-shaped anti-skid grooves 42 are formed along an edge of the first circular connecting portion and an edge of the second circular connecting portion respectively, multiple sliding teeth 43 are disposed in each arc-shaped anti-skid groove 42 in parallel, and anti-skid blocks are disposed at positions, opposite to the arc-shaped anti-skid grooves 42, of the first box body 1 and the second box body 2 respectively and extend into gaps between the sliding teeth 43. The anti-skid grooves 42 are arranged to prevent the first box body 1 and the second box body 2 from skidding at positions where the first box body 1 and the second box body 2 are stopped after being rotated to any angle; and when the anti-skid blocks rotate into the gap between any two sliding teeth 43, the box bodies will not be able to push the anti-skid blocks to move across the sliding teeth 43 to reach the next gap without manual force, so that the box bodies are fixed at this angle.

In a preferred embodiment, referring to FIG. 1-FIG. 4, arc-shaped stop grooves 41 are formed along an edge of the first circular connecting portion and an edge of the second circular connecting portion, and stop pillars are disposed at positions, opposite to the arc-shaped stop grooves 41, of the first box body 1 and the second box body 2 and extend into the arc-shaped stop grooves 41. The stop grooves 41 are arranged to limit the rotation angle of the first box body 1 and the second box body 2, so that the first box body 1 and the second box body 2 will not be rotated freely or excessively.

In a preferred embodiment, referring to FIG. 1-FIG. 4, the arc-shaped anti-skid grooves 42 and the arc-shaped stop grooves 41 have a radian of 90°. By setting the radian of the arc-shaped anti-skid grooves 42 and the arc-shaped stop grooves 41 to 90°, the first box body 1 and the second box body 2 can be rotated to any angle within 180°.

In this embodiment, referring to FIG. 1-FIG. 4, a power supply chamber 23 is disposed in the second box body 2, and the power supply 22 is installed in the power supply chamber 23; a power installation hole is formed in an outer wall, opposite to the power supply chamber 23, of the second box body 2, and a power supply lid 21 is disposed over the power installation hole. The power supply is installed in the power supply chamber 23, and a battery can be disassembled through the power supply chamber 23 and the power supply lid 21, so when the power supply breaks down, only the battery instead of the whole power box needs to be changed, thus reducing the maintenance cost.

In this embodiment, referring to FIG. 1-FIG. 4, a power wire outlet 12 is formed in an end, away from the shaft assembly 4, of the first box body 1, one end of the external connecting wire 5 is electrically connected to the main control circuit board 11, and the other end of the external connecting wire 5 stretches out via the power wire outlet 12. The external connecting wire 5 can stretch out via the power wire outlet 12 to supply power to an emergency light.

In this embodiment, referring to FIG. 1-FIG. 4, first installation portions 6 extend from a side wall of the first box body 1 and a side wall of the second box body 2 respectively, and first bolt holes 61 allowing bolts to be inserted and installed therein are formed in the first installation portions 6. The power box can be installed and fixed on an external wall or at any position through the first installation portions 6 and the first bolt holes 61.

In a preferred embodiment, referring to FIG. 1-FIG. 4, anti-skid portions 3 are disposed on sides, away from the installation portions, of the first box body 1 and the second box body 2, and the anti-skid portions 3 are located on edges of the first box body 1 and the second box body 2 and protrude upwards to form anti-skid lines. The anti-skid lines can prevent the power box from skidding from the hands of installation personnel when the power box is mounted by the installation personnel, and can also fulfill identifying and beautifying effects to some extent.

In a preferred embodiment, referring to FIG. 1-FIG. 4, a second installation portion 7 is disposed on a recess, between the first circular connecting portion and the second circular connecting portion, of the shaft assembly 4, and a second bolt hole 71 allowing a bolt to be inserted and installed therein is formed in the second installation portion 7. The second installation portion 7 and the second bolt hole are mainly used for fixing the shaft assembly 4. After the first box body 1 and the second box body 2 are installed, the shaft assembly 4 may swing under the effect of gravity or an external force, so the second installation portion 7 is used to fixedly install the shaft assembly 4 to effectively prevent the power box from swinging freely, thus improving the installation stability of the power box.

The invention has the following advantages:

1. The shaft assembly is arranged to connect two box bodies, so that the emergency power box may be of different structures to flexibly adapt to different installation scenarios.

2. The cavity is formed in the shaft assembly to allow connecting wires to penetrate through, so that a rotary structure is realized without exposing the internal connecting wires, and thus, the foldable emergency power box is safe and practical.

The above embodiments are merely several specific ones of the invention, and the invention is not limited to the above specific embodiments. Any variations obtained by those skilled in the art should also fall within the protection scope of the invention.

What is claimed is:

1. A foldable emergency power box with a shaft structure allowing wires to penetrate through, comprising a first box body for accommodating a main control circuit board and a second box body for accommodating a power supply, wherein the first box body and the second box body are rotatably connected through a shaft assembly, a cavity is formed in the shaft assembly, and wire holes communicated with the first box body and the second box body are formed in two sides of the cavity respectively; and an internal connecting wire connected to the power supply penetrates through the wire holes, stretches across the cavity in the shaft assembly and extends into the first box body to be electrically connected to the main control circuit board, and the main control circuit board is connected to an external emergency light through an external connecting wire.

2. The foldable emergency power box with a shaft structure allowing wires to penetrate through according to claim 1, wherein the shaft assembly is an 8-shaped shaft assembly having two ends provided with a first circular connecting portion and a second circular connecting portion respectively, the first circular connecting portion is rotatably connected to the first box body, the second circular connecting portion is rotatably connected to the second box body, and the wire holes are formed in a side, close to the first box body, of the first circular connecting portion and a side, close to the second box body, of the second circular connecting portion respectively.

3. The foldable emergency power box with a shaft structure allowing wires to penetrate through according to claim 2, wherein arc-shaped anti-skid grooves are formed along an edge of the first circular connecting portion and an edge of the second circular connecting portion respectively, multiple sliding teeth are disposed in each said arc-shaped anti-skid groove in parallel, and anti-skid blocks are disposed at positions, opposite to the arc-shaped anti-skid grooves, of the first box body and the second box body and extend into gaps between the sliding teeth.

4. The foldable emergency power box with a shaft structure allowing wires to penetrate through according to claim 2, wherein arc-shaped stop grooves are formed along an edge of the first circular connecting portion and an edge of the second circular connecting portion respectively, and stop pillars are disposed at positions, opposite to the arc-shaped stop grooves, of the first box body and the second box body and extend into the arc-shaped stop grooves.

5. The foldable emergency power box with a shaft structure allowing wires to penetrate through according to claim 4, wherein the arc-shaped anti-skid grooves and the arc-shaped stop grooves have a radian of 90°.

6. The foldable emergency power box with a shaft structure allowing wires to penetrate through according to claim 2, wherein a second installation portion is disposed on a recess, between the first circular connecting portion and the second circular connecting portion, of the shaft assembly, and a second bolt hole allowing a bolt to be inserted and installed therein is formed in the second installation portion.

7. The foldable emergency power box with a shaft structure allowing wires to penetrate through according to claim 1, wherein a power supply chamber is disposed in the second box body, and the power supply is installed in the power supply chamber; and a power installation hole is formed in an outer wall, opposite to the power supply chamber, of the second box body, and a power supply lid is disposed over the power installation hole.

8. The foldable emergency power box with a shaft structure allowing wires to penetrate through according to claim 1, wherein a power wire outlet is formed in an end, away from the shaft assembly, of the first box body, and the external connecting wire has an end electrically connected to the main control circuit board and an end stretching out via the power wire outlet.

9. The foldable emergency power box with a shaft structure allowing wires to penetrate through according to claim 1, wherein first installation portions extend from a side wall of the first box body and a side wall of the second box body, and first bolt holes allowing bolts to be inserted and installed therein are formed in the first installation portions.

10. The foldable emergency power box with a shaft structure allowing wires to penetrate through according to claim 8, wherein anti-skid portions are disposed on sides, away from the first installation portions, of the first box body and the second box body, and the anti-skid portions are located on edges of the first box body and the second box body and extend upwards to form anti-skid lines.

* * * * *